May 8, 1951 R. L. STEVEN 2,552,068
TIRE PRESSURE INDICATOR
Filed Nov. 25, 1946
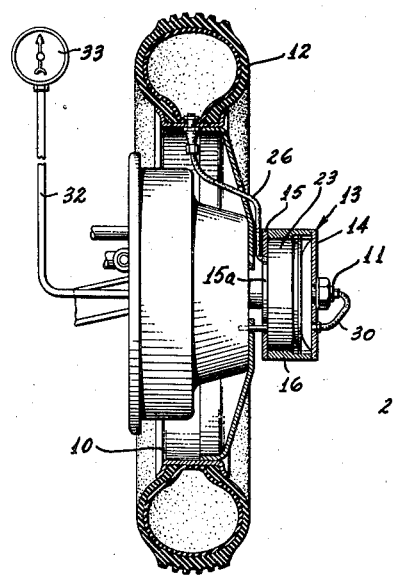
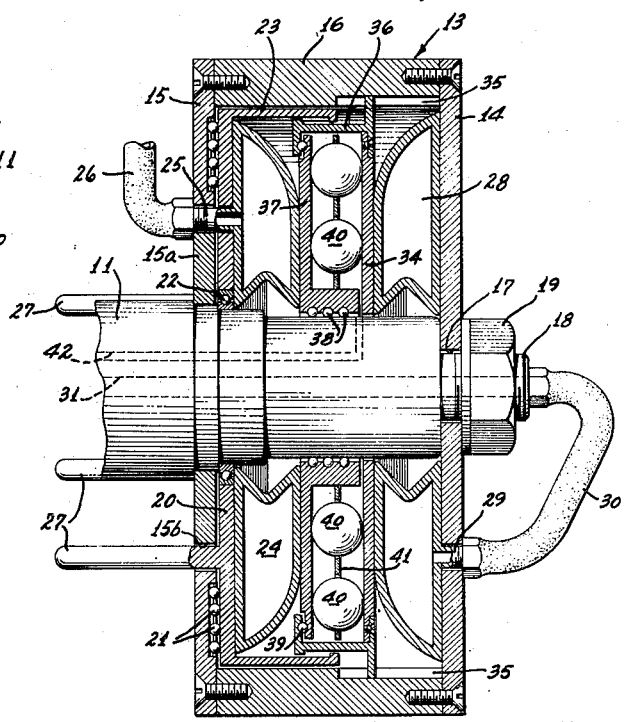
INVENTOR:
RAY L. STEVEN.
BY Huebner Malily
and Biehler
ATTORNEYS.

Patented May 8, 1951

2,552,068

UNITED STATES PATENT OFFICE 2,552,068

TIRE PRESSURE INDICATOR

Ray L. Steven, Los Angeles, Calif.

Application November 25, 1946, Serial No. 712,186

3 Claims. (Cl. 73—390)

This invention relates to motor vehicles and more especially to a tire pressure indicator for registering the pressure of the respective tires at all times.

An object of the invention is to provide a simple, practical and inexpensive tire pressure indicator for motor vehicle tires.

Another object of the invention is to provide tire pressure indicating means whereby the pressure of the respective tires of a motor vehicle can be registered or indicated at the dash of the vehicle at all times, including the time the motor vehicle is being operated.

A further object of the invention is to provide improvements in a tire pressure indicator incorporating novel means for transmitting the indicated pressures through the axles of the vehicle to the dash.

An additional object of the invention is to provide a tire pressure indicator having a fixed pressure responsive element and a rotatable responsive element and novel thrust bearing means therebetween having improved means for lubrication of the bearing means.

Other objects and advantages will appear and be brought out more fully in the following specification considered with reference to the accompanying drawings throughout which like parts are designated by like numerals.

In the drawings:

Figure 1 is an elevation view partly in section showing a motor vehicle wheel and a tire pressure indicator of my invention associated therewith.

Figure 2 is an enlarged view in section showing the pressure responsive features also shown in Figure 1.

Figure 3 is a side elevation view of the structure shown in Figure 2.

Figure 4 is a view similar to Figure 2 showing a modified form of my invention.

Referring more particularly to the drawings I show a wheel 10, such as the wheel of a motor vehicle, having a suitable bearing mounting on an axle 11, which is indicated as one of the fixed front axles of the vehicle, wheel 10 having a pneumatic tire 12 mounted thereon.

The tire pressure indicator of my invention comprises a casing 13 having a circular wall 14, a circular wall consisting of an annular member 15 and a similar member 15a, and a cylindrical wall 16 suitably secured together as by screws or the like, as shown. Wall 15a is suitably secured as by pressed fit on a portion of axle 11 and wall 14 has a central opening 17 through which extends a reduced threaded end portion 18 of the axle.

Walls 15 and 15a are separated by an annular space or slot 15b for a purpose to be presently described. Casing 13 is secured on the axle by a clamping action of a nut 19 on threaded end portion 18 which clamps wall 14 to a shouldered portion of the axle.

Casing 13 provides a housing for a shell 20 which is rotatable therein, thrust bearings 21 being provided between the shell and wall 15, a bearing race 22 being provided to support the shell on axle 11. Shell 20 has a flange portion 23 and a pressure responsive element 24 is positioned in the shell, as shown. Element 24 may be of any desired type but is shown as being an annular inflatable bag having flexibility and expansibility in an axial direction and having a stem 25 which extends through slot 15b and is connected by tube or conduit 26 to tire 12 is such manner that the pressure in element 24 is that of tire 12 and fluctuates with it to expand element 24 on an increase of pressure and contract it upon a reduction of the tire pressure.

A plurality of pins 27 extend axially from shell 20 through slot 15b and engage corresponding bores in the hub of wheel 10 in such manner that the shell 20 rotates with the wheel.

A fixed pressure responsive element 28 is contained in casing 13 adjacent wall 14 and has a stem 29 which extends through wall 14 and is connected by conduit 30 to a bore or passage 31 formed in the axle 11, the inner end of bore 31 being connected to a conduit 32 which leads to a pressure indicating gauge 33 mounted on the dash of the motor vehicle.

An annular plate 34 is disposed in casing 13 adjacent pressure responsive element 28 and has an annular flange portion 36, the peripheral portion of the flange being guided axially in a recess 35 in cylindrical wall 16. A plate 37 is provided adjacent pressure responsive element 24 and is bearing mounted at 38 on axle 11 and has a thrust bearing engagement 39 with flange 36 of plate 34. A plurality of thrust roller bearing members 40 are suitably disposed as by a ring or cage 41 between plates 34 and 37, it being apparent that plates 34 and 37 are slidable axially upon changes in pressure in pressure responsive element 24, plate 34 bearing against pressure responsive element 28 so that the pressure in element 24 is reflected as the pressure in element 28. Axle 11 may be provided with a lubrication bore or passage 42 which terminates adjacent bearings 38 and may be supplied with lubrication in any suitable manner.

In Figure 4 I show a modified form of my invention. In this figure I show a casing 45 mounted at one end of a rotatable axle 46, such as the driving axle of a motor vehicle, the casing containing a fixed pressure responsive element 47 connected as by conduit 48 to a gauge similar to gauge 33 on the dash of the vehicle, the casing containing a rotatable pressure responsive element in a shell 50 connected as by conduit 49 to the tire of a wheel, the shell having a plurality of pins 51 for engagement with the wheel. Axle 46 is provided with a lubrication passage 52 having an external fitting 53 and adapted to lubricate the thrust plates between the pressure responsive elements the same as the structure of Figures 1 to 3.

The operation of the invention should be apparent from the foregoing description. Pressure responsive element 24, being pressurally connected by tube or conduit 26 to tire 12, will expand or contract in an axial direction upon increase or decrease of pressure in the tire. Upon an increase of such pressure, plate 37 will be shifted to the right, as seen in Figure 2, thereby shifting plate 34 to the right and causing an increase of pressure in pressure responsive element 28. The pressure in this latter element will be transmitted through conduits 30 and 32 through shaft bore 31 to the gauge 33. In similar manner a reduction in tire pressure will cause a reverse movement of plates 34 and 37 and the pressure in the tire can be constantly observed on the gauge.

Similar operation occurs with the modification shown in Figure 4, the pressure in element 47 being conducted directly through conduit 48 to the gauge rather than being conducted through the axle shaft.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices and systems.

Having thus described my invention, what I claim and desire to secure by Letters Patent is:

1. A tire pressure indicator for a tire on a wheel comprising a casing mounted on the wheel axle independently of the wheel, a fixed pressure responsive element in said casing adapted to actuate a pressure indicator gauge, an inflatable rotary element in said casing expansible axially upon an increase of pressure therein and pressurally connected to said tire, and thrust bearing means between said elements including a pair of plates and bearing elements therebetween, one of said plates having a peripheral retaining flange engagement with the other of said plates, said plates being rotatable with respect to each other and relatively immovable in all other respects.

2. A tire pressure indicator for a tire on a wheel comprising a casing mounted on the wheel axle independently of the wheel, a fixed pressure responsive element in said casing adapted to actuate a pressure indicator gauge, an inflatable rotary element in said casing expansible axially upon an increase of pressure therein and pressurally connected to said tire, and thrust bearing means between said elements including a pair of plates and bearing elements therebetween, one of said plates having a peripheral retaining flange and bearing engagement with the other of said plates, said engagement including an inwardly extending radial flange on said first plate, said plates being rotatable with respect to each other and relatively immovable in all other respects.

3. A tire pressure indicator for a tire on a wheel comprising a casing mounted on the wheel axle outside of the wheel having a passage, a fixed pressure responsive element in said casing pressurally connected to said passage and adapted to actuate a pressure indicator gauge, an inflatable rotary element in said casing connected to said wheel and expansible axially upon an increase of pressure therein and pressurally connected to said tire, and thrust bearing means between said elements including a pair of plates having a retaining flange engagement and bearing elements therebetween, said plates being rotatable with respect to each other and relatively immovable in all other respects.

RAY L. STEVEN.

REFERENCES CITED

The following references are of record in the file of this patent:

UNITED STATES PATENTS

| Number | Name | Date |
|---|---|---|
| 1,849,139 | Denmire | Mar. 15, 1932 |
| 2,119,287 | Pratt | May 31, 1938 |
| 2,152,159 | Smith et al. | Mar. 28, 1939 |
| 2,253,118 | Gillespie et al. | Aug. 19, 1941 |